United States Patent Office 3,402,173
Patented Sept. 17, 1968

3,402,173
18-LOWER ALKYL PREGNANES AND DERIVATIVES
John A. Edwards, Palo Alto, Calif., assignor to Syntex Corporation, Panama, Panama, a corporation of Panama
No Drawing. Continuation-in-part of application Ser. No. 441,297, Mar. 19, 1965. This application Feb. 18, 1966, Ser. No. 528,398
24 Claims. (Cl. 260—239.55)

This application is a continuation-in-part of United States application Ser. No. 441,297, filed Mar. 19, 1965, now abandoned.

The present invention relates to a novel process for the preparation of 18-lower alkyl-20-hydroxy-pregnanes, 18-lower alkyl-20-hydroxy-19-norpregnanes and derivatives thereof unsaturated in the ring nucleus and novel intermediates thereof.

The process of the present invention is illustrated diagrammatically as follows using, for the sake of simplicity, only the C and D rings of the steroid nucleus.

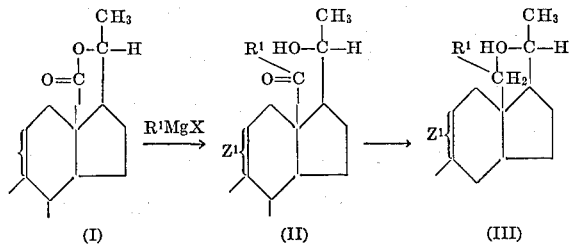

In the above formulas, $R^1$ represents a lower alkyl radical containing from 1 to 3 carbon atoms such as methyl, ethyl, propyl, and isopropyl, X is chloride, bromide or iodide, and $Z^1$ represents a single bond or a double bond between carbon-9 and carbon-11.

In carrying out the above-illustrated process, the steroid starting material I is reacted with a molar excess, preferably from about 10 mols to about 60 mols, more preferably about 10 to 40 mols, of a lower alkyl magnesium halide per mol of steroid starting material in a suitable solvent such as the aromatic hydrocarbons, for example, benzene, toluene, xylene, or the like, either alone or in admixture with lesser amounts of inert organic solvents such as dioxane, tetrahydrofuran, or the like, at a temperature ranging from about 60° C. to about 150° C., and preferably at the reflux temperature of the solvent employed, for from about 24 hours to about 72 hours or longer depending upon temperature and concentration or reactants, thus giving the 18-alkyl-18-keto steroid (II). Suitable alkyl magnesium halides include the alkyl magnesium bromides, chlorides, and iodides, preferably the chlorides, wherein said alkyl contains from 1 to 3 carbon atoms such as ethyl, propyl, methyl, or isopropyl.

The novel 18-lower alkyl-18-one intermediates (II) can be directly converted to the 18-alkyl-18-unoxygenated steroid (III) by Wolff-Kishner reduction, e.g., by refluxing in a lower alkylene glycol, such as ethylene glycol, propylene glycol, diethylene glycol, or the like, with hydrazine hydrate, followed by the addition of potassium hydroxide and further refluxing to give a total time of from about 4 to about 8 hours, or by reaction with hydrazine dihydrochloride in the manner described by Nagata et al. in Chemistry and Industry (London), page 1194 (1964).

Reduction of the 18-lower alkyl-18-one steroid (II) is preferably carried out by the method diagrammatically illustrated as follows showing only the C and D rings wherein $R^1$ and $Z^1$ are as defined above.

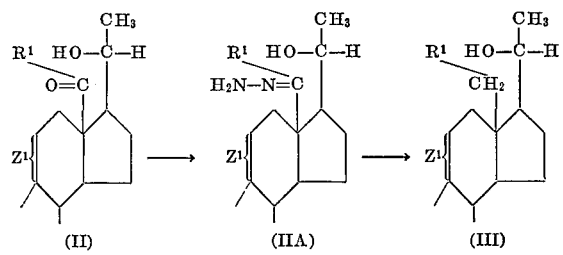

In practicing the above-illustrated method, the 18-alkyl 18-one steroid (II) is treated with an excess of hydrazine hydrate in an alcohol or glycol solvent such as ethanol, ethylene glycol, triethylene glycol and the like, at an elevated temperature, preferably under reflux or about 145° C. or higher, for a time sufficient, generally about 5 hours or more, to obtain the hydrazone (IIA). Preferably, the hydrazone (IIA) is obtained by reacting the steroid (II) with an excess of hydrazine hydrate, e.g., about 20 to about 40 molar equivalents in a lower alkylene glycol such as triethylene glycol in the presence of about 5 to about 10 molar equivalents, preferably about 7 molar equivalents of a strong acid such as hydrochloric acid or alternatively, hydrazine dihydrochloride, para-toluenesulfonic acid, or the like.

The hydrazine steroid (IIA) is then converted into the 18-alkyl-20β-hydroxy steroid (III) by treatment with a strong base. Preferably, this reaction is accomplished by adding a solution of the hydrazone (IIA) in a solvent such as the lower alkylene glycols, e.g. diethylene glycol, to a solution of a strong base in an organic solvent medium while maintaining the temperature of the latter solution at about 215° to 240° C., preferably 225° C. The organic solvent medium should have a relatively high boiling point and should be one in which the strong base, e.g. sodium or potassium hydroxide, is soluble such as the lower alkylene glycols, preferably diethylene glycol. The concentration of base in the organic solvent medium may suitably be about 1 to 10%, preferably 3 to 5%. Optionally, in addition to the strong base, there may be present in the organic solvent medium a small amount, e.g. about 1 to 10%, of hydrazine hydrate. The reaction time is of the order of 2 hours or less to 7 hours or more, generally about 5 hours depending upon the temperature and concentration of reactants. The reaction is preferably conducted under an inert atmosphere such as nitrogen. This reaction may also be accomplished by treating the hydrazone (IIA) with potassium t-butoxide in a solvent medium of, for example, anhydrous dimethylsulfoxide, toluene, and the like at room temperature or above in the manner described by Cran et al. in the Journal of the American Chemical Society, 84, 1734–1735 (1962) and Grundon et al. in the Journal of the Chemical Society (London), pp. 1855–1858 (1963).

Included among the starting materials I in the above-illustrated process are the Δ⁵-pregnene-3β,20β-diol-18-oic acid 18,20-lactones and 3-esters thereof represented by the general formula:

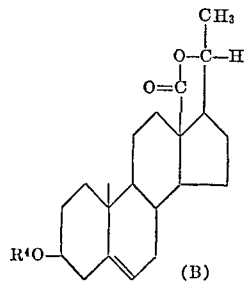

wherein $R^4$ represents hydrogen or an acyl group, which can be obtained as described in Meystre et al. in Helv. Chim. Acta, 45, 1317–1343 (1962).

The starting material I can also be a 19-nor-$\Delta^{5(10)}$-pregnene-3β,20β-diol-18-oic acid 18,20-lactone 3-acylate represented by the general formula:

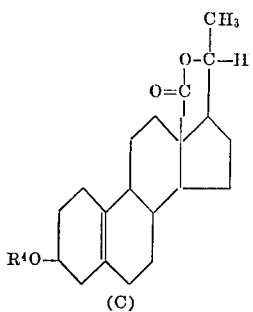

wherein $R^4$ has the same meaning as set forth hereinabove for Formula B, which can be obtained by first subjecting a $\Delta^5$-pregnene-3β,19-diol-20-one 3-acylate, e.g., the 3-acetate, to Jones' oxidation conditions, using 8 N chromic acid at about 0° C. to give the corresponding 10β-carboxy steroid, e.g., 10β-carboxy-$\Delta^5$-pregnen-3β-ol-20-one-3-acetate, heating the thus-obtained 10β-carboxy steroid in anhydrous pyridine in the manner descrcibed by Gardi et al. in Gazz. Chim. Ital., 514–524 (1963), thus giving the corresponding 19-nor-$\Delta^{5(10)}$-20-one, e.g., 19 - nor - $\Delta^{5(10)}$-pregnen-3β-ol-20-one 3-acetate, reducing the keto group using, for example, sodium borohydride in an inert organic solvent such as dioxane or the like, to give the corresponding 3,20-diol, e.g., 19-nor-$\Delta^{5(10)}$-pregnene-3β-20β-diol 3-acetate, and then using this 3,20-diol 3-acetate as the starting material for the formation of the corresponding 18,20-lactone by the method described in the aforementioned Meystre et al. article for the preparation of the corresponding $\Delta^5$-compound (see page 1332 of said article), thus giving a 19-nor-$\Delta^{5(10)}$-pregnene-3β,20β-diol-18-oic acid 18,20-lactone 3-acylate, e.g., the acetate, which can then be converted, if desired, to the corresponding free 3β-ol by conventional hydrolysis techniques.

The starting material I can also be a 3-cycloalkylenedioxy-19-nor-$\Delta^5$-pregnen-20β-ol-18-oic acid 18,20-lactone or a 3-cycloalkylenedioxy-$\Delta^5$-pregnen-20β-ol-18-oic acid 18,20-lactone, e.g., the 3-cycloethylenedioxy compound represented by the following formula wherein R is hydrogen or methyl:

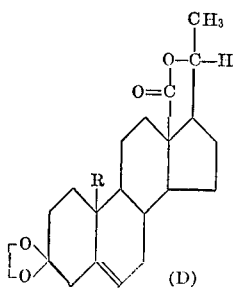

The starting material I can also be a 3-cycloalkylenedioxy-$\Delta^{5,9(11)}$-pregnadien-20β-ol-18-oic acid 18,20-lactone, e.g., the 3-cycloethylenedioxy compound represented by the following formula:

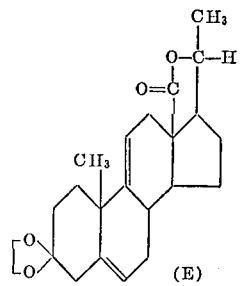

In addition to the preferred starting materials illustrated by Formulas B through E, the following 18,20-lactones of the 20-hydroxy-pregnanes, 19-norpregnanes, and derivatives thereof unsaturated in the ring nucleus may be used in the process of the present invention:

3β-acyloxy-20β-hydroxy-5α-pregnan-18-oic acid 18,20-lactone,
3β-acyloxy-20β-hydroxy-11-oxo-5α-pregnan-18-oic acid 18,20-lactone,
3β,11β-diacyloxy-20β-hydroxy-5α-pregnan-18-oic acid 18,20-lactone,
3α-acyloxy-20β-hydroxy-5β-pregnan-18-oic acid 18,20-lactone,
3α-acyloxy-20β-hydroxy-11-oxo-5β-pregnan-18-oic acid 18,20-lactone,
3α,11β-diacyloxy-20β-hydroxy-5β-pregnan-18-oic acid 18,20-lactone,
3α,11α-diacyloxy-20β-hydroxy-5β-pregnan-18-oic acid, 18,20-lactone,
11α-acetoxy-20β-hydroxy-3-ethylenedioxy-$\Delta^4$-pregnen-18-oic acid 18,20-lactone,
3-ethylenedioxy-20β-hydroxy-11-oxo-$\Delta^5$-pregnen-18-oic acid 18,20-lactone,
3-ethylenedioxy-11-oxo-20β-hydroxy-$\Delta^4$-pregnen-18-oic acid 18,20-lactone,
3-ethylenedioxy-20β-hydroxy-$\Delta^{5,9(11)}$-pregnadien-18-oic acid 18,20-lactone,
3-ethylenedioxy-9,11β-oxido-20β-hydroxy-$\Delta^4$-pregnen-18-oic acid 18,20-lactone,
3-ethylenedioxy-11-oxo-20β-hydroxy-19-nor-$\Delta^4$-pregnen-18-oic acid 18,20-lactone,
3-ethylenedioxy-11-oxo-20β-hydroxy-19-nor-$\Delta^5$-pregnen-18-oic acid 18,20-lactone,
3-ethylene-dioxy-20β-hydroxy-5α-pregnan-18-oic acid 18,20-lactone,
3-ethylene-dioxy-11-oxo-20β-hydroxy-5α-pregnan-18-oic acid 18,20-lactone,
3-ethylenedioxy-11β-acyloxy-20β-hydroxy-5α-pregnan-18-oic acid 18,20-lactone,
3-ethylenedioxy-20β-hydroxy-5β-pregnan-18-oic acid 18,20-lactone,
3-ethylenedioxy-11-oxo-20β-hydroxy-5β-pregnan-18-oic acid 18,20-lactone,
3-ethylenedioxy-11β-acyloxy-20β-hydroxy-5β-pregnan-18-oic acid 18,20-lactone,
3-ethylenedioxy-11-oxo-20β-hydroxy-5β-pregnan-18-oic acid 18,20-lactone,
3-ethylenedioxy-11-oxo-20β-hydroxy-$\Delta^4$-pregnen-18-oic acid 18,20-lactone,
3-ethylenedioxy-11α-acetoxy-20β-hydroxy-$\Delta^4$-pregnen-18-oic acid 18,20-lactone,
3-ethylenedioxy-11-oxo-20β-hydroxy-$\Delta^5$-pregnen-18-oic acid 18,20-lactone,
3-ethylenedioxy-11α-acetoxy-20β-hydroxy-$\Delta^5$-pregnen-18-oic acid 18,20-lactone,
3-ethylenedioxy-11β-acetoxy-20β-hydroxy-$\Delta^4$-pregnen-18-oic acid 18,20-lactone, 3-ethylenedioxy-11β-acetoxy-20β-hydroxy-Δ⁵-pregnen-
  18-oic acid 18,20-lactone,
3-ethylenedioxy-11-oxo-20β-hydroxy-Δ⁴-pregnen-18-oic
  acid 18,20-lactone,
3-ethylenedioxy-11-oxo-20β-hydroxy-Δ⁵-pregnen-18-oic
  acid 18,20-lactone,
3-ethylenedioxy-20β-hydroxy-Δ⁴,⁹⁽¹¹⁾-pregnadien-18-oic
  acid 18,20-lactone,
3-ethylenedioxy-9,11β-oxido-20β-hydroxy-Δ⁴-pregnen-
  18-oic acid 18,20-lactone,
3-ethylenedioxy-9,11β-oxido-20β-hydroxy-Δ⁵-pregnen-18-
  oic acid 18,20-lactone,
3-etheylenedioxy-20β,21-dihydroxy-Δ⁵-pregnen-18-oic
  acid 18,20-lactone,
3-ethylenedioxy-20α-hydroxy-Δ¹,⁴-pregnadien-18-oic
  acid 18,20-lactone,
3-ethylenedioxy-11-oxo-20β-hydroxy-19-norΔ⁴-pregnen-
  18-oic acid 18,20-lactone,
3-ethylenedioxy-11-oxo-20β-hydroxy-19-nor-Δ⁵-pregnen-
  18-oic 18,20-lactone, and the like.

While the foregoing description of suitable starting materials for the novel process of the present invention has been with particular reference to the 20β-hydroxy-18-oic acid 18,20-lactones, the present invention may also use as starting materials the 20α-hydroxy-18-oic acid 18,20-lactones to prepare the corresponding 18-lower alkyl-20α-hydroxy-18-one steroid which can be reduced to the corresponding 18-lower alkyl-20α-hydroxy steroid.

Preparation of the foregoing 18,20-lactones and others suitable as starting materials for the process of the present invention and starting materials therefor may be accomplished, for example, in accordance with the methods described in the aforementioned Meystre et al. article and U.S. Patents 3,092,625 and 3,121,080.

The 18-lower alkyl-20-hydroxy-pregnanes, 19-norpregnanes and unsaturated derivatives thereof are valuable intermediates for the preparation of, for example, the 18-lower alkyl-pregnane and 19-norpregnane derivatives represented by the following formula:

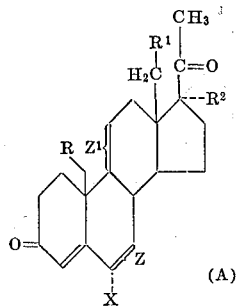

(A)

wherein R represents hydrogen or methyl, R¹ represents a lower alkyl group containing from 1 to 3 carbon atoms, e.g., methyl, ethyl, propyl, isopropyl, or the like, R² represents hydrogen, a hydroxyl group or an acyloxy group, X represents hydrogen, methyl, or a halogen having an atomic number less than 53, e.g., fluorine, chlorine, or bromine, Z and Z¹ each represent a saturated linkage or a double bond between the carbon atom at the 6- and 7-positions and 9- and 11-positions, respectively, with Z being a saturated linkage when X is hydrogen.

The acyl and acyloxy groups referred to above and hereinafter are preferably derived from hydrocarbon carboxylic acids containing less than 12 carbon atoms which may be saturated or unsaturated, of straight, branched, cyclic or cylic-aliphatic chain or aromatic, and may be substituted by functional groups such as hydroxy, alkoxy containing up to 5 carbon atoms, acyloxy, containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

For example, the 18-lower alkyl-20-hydroxy steroids described hereinabove are valuable intermediates for the preparation of 18-alkyl steroids of the type characterized by Formula A above. Thus, 18-alkyl progesterones and 19-norprogesterones can be prepared by a reaction scheme which can be illustrated as follows:

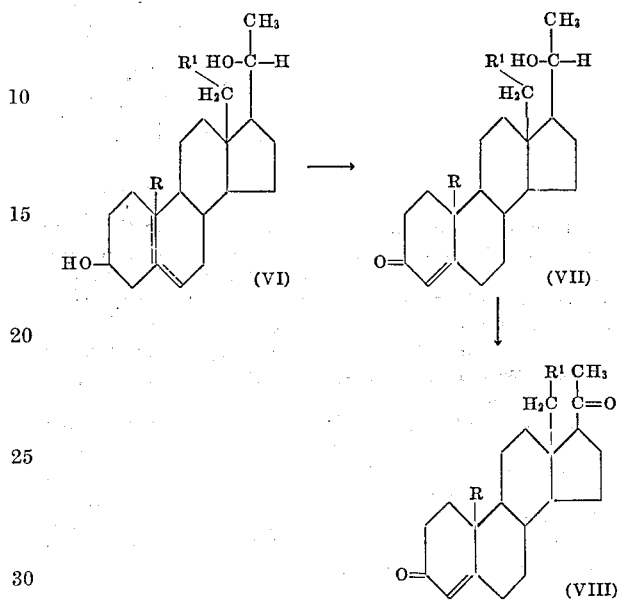

The above reaction (VI→VII→VIII) is fully described in parent application Ser. No. 441,297 referred to hereinabove.

The 18-lower alkyl-20-hydroxy steroids (III) prepared by the process of the present invention can also be used to prepare 17α-hydroxy and 17α-acyloxy-18-alkyl-6-unsubstituted progesterones represented by Formula A (R=methyl) hereinabove as illustrated (Formulas IX through XVIII) and described in United States application Ser. No. 441,297, filed Mar. 19, 1965.

Another suitable procedure which can be used to prepare both the 17α-hydroxy and 17α-acyloxy-18-alkyl-6-unsubstituted progesterones and their 19-nor counterparts represented by Formula A hereinabove can be represented schematically as follows:

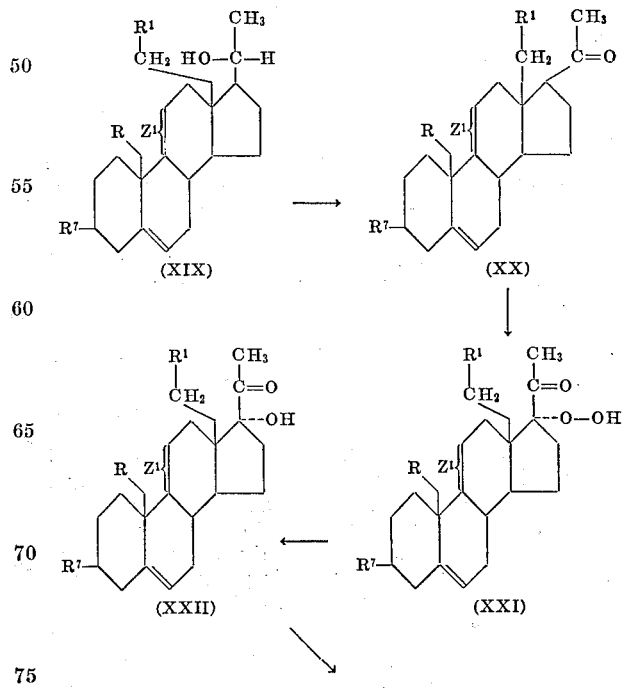

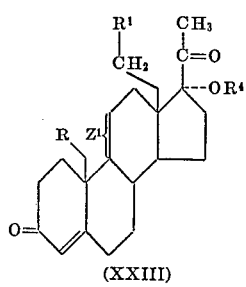

(XXIII)

In the above formulas, R, $R^1$ and $Z^1$ have the same meaning as set forth hereinabove for Formula A, $R_4$ represents an acyl group, preferably acetyl, as defined hereinabove, and $R^7$ represents an acyloxy group, preferably acetoxy, or cycloethylenedioxy, provided that when $Z^1$ is a double bond then $R^7$ is a cycloalkylenedioxy group and R is methyl and further, when $R^7$ is an acyloxy group, then R is methyl.

In carrying out this reaction scheme, where the starting material XIX is an 18-alkyl-$\Delta^5$-pregnene-3$\beta$,20$\beta$-diol 3-acylate or the corresponding 19-nor-$\Delta^{5(10)}$-compound, e.g., 18-methyl-$\Delta^5$-pregnene-3$\beta$-20$\beta$-diol 3-acetate (XIX; R and $R^1$=methyl, $R^7$=acetoxy), obtainable by selective acylation of the corresponding 3,20-diol using glacial acetic acid at steam-bath temperature, it is subjected to Jones' oxidation to give the corresponding 20-ketone (XX), e.g., 18-methyl-$\Delta^5$-pregnen-3$\beta$-ol-20-one 3-acetate (XX; R and $R^1$=methyl, $R^7$=acetoxy).

Where the starting material is a 3-cycloalkylenedioxy-18-alkyl-19-nor-$\Delta^5$-pregnen-20$\beta$-ol, e.g., 3-cycloethylenedioxy-18-methyl-19-nor-$\Delta^5$-pregnen-20$\beta$-ol (XIX; R=hydrogen $R^1$=methyl, $R^7$=cycloethylenedioxy), it will be oxidized to the corresponding 20-keto steroid using chromium trioxide in pyridine or the like, preferably at room temperature overnight, thus giving, for example, 3-cycloethylene dioxy-18-methyl-19-nor-$\Delta^5$-pregnen-20-one (XX; R=hydrogen, $R^1$=methyl, $R^7$=cycloethylenedioxy).

Where the starting material is a 3-cycloalkylenedioxy-18-loweralkyl-$\Delta^5$-pregnen-20 $\beta$-ol, e.g., 3-cycloethylenedioxy-18-methyl-$\Delta^5$-pregnen-20$\beta$-ol or a 3-cycloalkylenedioxy-18-loweralkyl-$\Delta^{5,9(11)}$-pregnadiene-20$\beta$-ol, e.g. 3-cycloalkylenedioxy - 18 - methyl - pregna - 5,19(11) - dien-20$\beta$-ol (XIX; R and $R^1$ are methyl and Z is a double bond between carbon-9 and carbon-11), it may be oxidized to the corresponding 20-keto steroid by Jones' oxidation or by using chromium trioxide in pyridine or the like affording, for example, 3 - cycloethylenedioxy - 18 - methyl - pregna - 5,9(11)-dien-20-one.

The thus-obtained 20-ones are then reacted with an alkali metal tertiary alkoxide, such a sodium t-butoxide, potassium t-butoxide, or the like, in the presence of oxygen gas, preferably at a temperature of from about 5° C. to about 20 C., for from about 30 minutes to about 2 hours, thus giving the corresponding 17$\alpha$-hydroperoxy compound XXI, e.g., 17$\alpha$ - hydroperoxy - 18 - methyl-$\Delta^5$-pregnen-3$\beta$-ol-20-one 3-acetate (XXI; R and $R^1$=methyl, $R^7$=acetoxy), 3-cycloethylenedioxy (XXI; R=hydrogen; $R^1$=methyl; $R^7$=cycloethylenedioxy), or 3-cycloethylenedioxy - 17$\alpha$ - hydroperoxy - 18 - methyl - pregna-$\Delta^{5,9(11)}$-dien-20-one.

By subjecting the thus-formed 17$\alpha$-hydroperoxy steroid to catalytic hydrogenation, using a platinum or palladium hydrogenation catalyst, e.g., platinum-on-charcoal, palladium-on-calcium carbonate, or the like, in a lower alkanol, such as methanol, ethanol, or the like, preferably at room temperature and atmospheric pressure, the corresponding 17$\alpha$-hydroxy steroid (XXII), e.g., 18-methyl-$\Delta^5$-pregnene-3$\beta$,17$\alpha$-diol-20-one 3-acetate (XXII; R and $R^1$=methyl; $R^7$=acetoxy), 3-cycloethylenedioxy-18-methyl-19-nor-$\Delta^5$-pregnen-17$\alpha$-ol-20-one (XXII, R=hydrogen, $R^1$=methyl, $R^7$=cycloethylenedioxy), or 3-cycloethylenedioxy-18-methyl-$\Delta^{5,9(11)}$-pregnadiene - 17$\alpha$-ol-20-one (XXII; R and $R^1$ are methyl, $R^7$ is cycloethylenedioxy, and $Z^1$ is a double bond between carbon-9 and carbon-11) is obtained.

The thus-obtained 18-alkyl-$\Delta^5$-pregnene-3$\beta$,17$\alpha$-diol-20-one 3-acylates can be acylated in the manner described hereinabove to give the corresponding 3,17-diacylates which can be selectively hydrolyzed at the 3-position in the manner described hereinabove to give the corresponding 17-monoacylates, which are then subjected to Oppenauer oxidation to give the corresponding 18-alkyl-$\Delta^4$-pregnen-17$\alpha$-ol-3,20-dione 17-acylates (XXIII; R and $R^1$=methyl, $R^4$=acetoxy), which can be hydrolyzed in the manner described hereinabove to give the corresponding free 17$\alpha$-ols.

Similarly, the 3-cycloalkylenedioxy-18-alkyl-19-nor-$\Delta^5$-pregnen-17$\alpha$-ol-20-ones, the 3-cycloalkylenedioxy-18-alkyl-$\Delta^5$-pregnen-17$\alpha$-ol-20-ones, or the 3-cycloalkylenedioxy-18-alkyl-$\Delta^{5,9(11)}$-pregnadiene-17$\alpha$-ol-20-ones can be hydrolyzed, using an acid such as sulfuric, hydrochloric, p-toluenesulfonic or the like, in an inert organic solvent such as methanol, acetone, or the like, to give the corresponding 18-alkyl-19-nor-$\Delta^4$-pregnen-or 18-alkyl-$\Delta^4$-pregnen-17$\alpha$-ol-3,20-diones or 18-alkyl-$\Delta^{4,9(11)}$-pregnadiene-17$\alpha$-ol-3,20-diones (XXIII), e.g., 18-methyl-19-nor-$\Delta^4$-pregnen-17$\alpha$-ol-3,20-dione (XXIII; R and $R^4$=hydrogen, $R^1$=methyl), which can then be acylated to give the corresponding 17-acylates. Alternatively, hydrolysis and esterification can be carried out in one step by reacting the 3-cycloalkylenedioxy intermediate with a mixture of acyl anhydride and organic acid in the presence of an acid catalyst such as p-toluenesulfonic acid or the like.

In lieu of hydrolyzing the steroid XXIII to the corresponding 3-keto steroid, valuable 18-alkyl corticoids may be prepared by the process outlined below using, for example, 3-cycloethylenedioxy-18-loweralkyl-$\Delta^{5,9(11)}$-pregnadien-17$\alpha$-ol-20-one as the starting material.

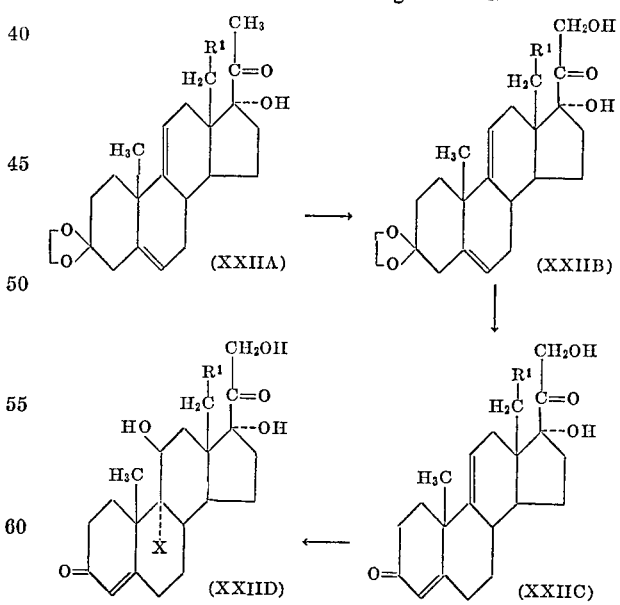

In the above formulas, $R^1$ is as defined hereinabove and X is fluorine, chlorine or bromine.

18-alkyl corticoids, as represented by Formula XXIID, are valuable therapeutic agents possessing corticoid activity. These compounds may be further reacted to introduce additional substituents such as 1, 2, 6 or 16-methyl, 6-halo, and so forth to prepare other corticoids of useful therapeutic properties.

In practicing the process outlined above, the steroid XXIIA, e.g. 3-cycloethylenedioxy-18-methyl-$\Delta^{5,9(11)}$-pregnadiene-17$\alpha$-ol-20-one, is treated with calcium oxide and iodine in, e.g., tetrahydrofuran and methanol to obtain the corresponding 20-keto-21-iodo steroid which when treated with potassium acetate in, e.g., acetone affords the corresponding 20-keto-21-acetoxy steroid. Hydrolysis of the 20-keto-21-acetoxy steroid by, e.g., potassium bicarbonate in methanol affords the corresponding 20-keto-21-ol steroid. The thus-obtained 20-keto-21-hydroxy steroid (XXIIB) upon treatment with acid, e.g., p-toluenesulfonic acid, in a ketone such as acetone is hydrolyzed to the 18-loweralkyl-$\Delta^{4,9(11)}$-pregnadiene-17$\alpha$,21$\beta$-diol-3,20-dione (XXIIC). The steroid XXIIC may be transformed by treatment with, e.g. N-bromosuccinimide in aqueous diethylether in the presence of a small amount of perchloric acid into the corresponding 11$\beta$-ol-9$\alpha$-bromo steroid which may be further converted to the corresponding 9,11-epoxide and then treated with hydrogen fluoride or hydrogen chloride to obtain the corresponding 11$\beta$-ol, 9$\alpha$-fluoro or 9$\alpha$-chloro steroid (XXIID) by known methods; see for example, Fried et al., J.A.C.S., 79, 1130 (1957) and Fieser and Fieser, "Steroids," Reinhold Publishing Corp., New York, 682,683 (1959).

The 18-loweralkyl-20-hydroxy steroids (III) prepared by the present invention can also be used to prepare the 6-substituted 18-alkyl-progesterones and 19-norprogesterones represented by Formula A hereinabove as illustrated (Formulas XXIV through XXIX and XXX through XXXV, respectively) and described in patent application Ser. No. 441,297 referred to above.

In order that those skilled in the art can more fully understand the present invention, the following examples are set forth. These examples are given solely for the purpose of illustrating the invention and not as a limitation thereof.

PREPARATION A

A solution of 1 gram of $\Delta^5$-pregnene-3$\beta$,19-diol-20-one 3-acetate in 10 cc. of acetone was cooled to 0° C. and then admixed under an inert nitrogen atmosphere, with stirring, with a solution of 8 N chromic acid, the acid solution being added until its color persisted in the mixture.

The chromic acid solution was prepared by mixing 26 grams of chromium trioxide with 23 cc. of concentrated sulfuric acid and diluting with water to give 100 cc. of solution.

Following the addition of the chromic acid solution the reaction mixture was stirred for an additional 5 minutes at 0–5° C., then diluted with water. The resulting precipitate was collected by filtration, washed with water and dried under vacuum. Recrystallization from acetone/hexane gave 10$\beta$-carboxy-$\Delta^5$-pregnen-3$\beta$-ol-20-one 3-acetate.

The thus-obtained 10$\beta$-carboxy steroid, when heated at reflux temperature for 2 hours in 10 cc. of anhydrous pyridine (cf. the above-mentioned Gardi et al. article), gave 19-nor-$\Delta^{5(10)}$-pregnen-3$\beta$-ol-20-one 3-acetate.

A solution of 2 grams of sodium borohydride in 30 cc. of water was added, with stirring, to a solution of 2 grams of the thus-obtained 19-nor steroid in 40 cc. of dioxane, and the resulting reaction mixture was allowed to stand at room temperature for 16 hours. Following this reaction period excess sodium borohydride was decomposed by the addition of acetic acid and the solution was concentrated to a small volume under vacuum and then diluted with water. Next, the product was extracted with ethyl acetate, and this extract was washed with water, dried over anhydrous sodium sulfate and evaporated to dryness. Crystallization of the resulting solid residue from acetone/hexane gave 19 - nor - $\Delta^{5(10)}$ - pregnene-3$\beta$,20$\beta$-diol 3-acetate.

The thus-obtained 3$\beta$,20$\beta$-diol, when treated according to the procedure given at page 1332 of the aforementioned Meystre et al. article, gave 19-nor-$\Delta^{5(10)}$-pregnene-3$\beta$,20$\beta$-diol-18-oic acid 18,20-lactone 3-acetate.

PREPARATION B

A mixture of 2 grams of 19-nor-progesterone, 30 cc. of 2 - cycloethylenedioxybutane (2-methyl-2-ethyl-1,3-dioxolane) and 70 mg. of p-toluenesulfonic acid was refluxed with distillation for 1 hour. Following this reaction period the reaction mixture was cooled to room temperature, diluted with water and extracted with ethyl acetate. The thus-obtained extract was washed with water until neutral, then dried over anhydrous sodium sulfate and evaporated to dryness. Crystallization from acetone/hexane gave 3-cycloethylenedioxy-19-nor-$\Delta^5$-pregnen-20-one.

Reduction of the 20-keto group in the thus-obtained 3-cycloethylenedioxy steroid, using sodium borohydride in dioxane in the manner described in the preceding preparation, gave 3-cycloethylenedioxy - 19 - nor-$\Delta^5$-pregnen-20$\beta$-ol.

By using this 20$\beta$-ol as the starting material for the lactone-forming procedure of the aforementioned Meystre et al. article, 3-cycloethylenedioxy-19-nor-$\Delta^5$-pregnen-18-oic acid 18,20-lactone was obtained.

PREPARATION C

A mixture of 1.0 gram of chromium trioxide, 2.0 grams of silver chromate, 10 ml. of water and 10 ml. of pyridine was stirred for one hour and cooled to 0° C. To this mixture there was added 1.1 grams of 3-cycloethylenedioxy-18-iodo-18,20-oxido-$\Delta^{5,9(11)}$-pregnadiene in 10 ml. of pyridine. The resulting mixture was then stirred for about 48 hours at 40° C., cooled and treated with ether and dilute sodium chloride solution. The reaction mixture was then filtered, the organic layer separated and extracted several times with ether. The extracts were washed with water, dried, and evaporated under vacuum. The residue was chromatographed on silica gel eluting with benzene/ethyl acetate affording 3-cycloethylenedioxy-$\Delta^{5,9(11)}$-pregnadien-18-oic acid 18,20-lactone.

Example I

A solution of 1 gram of $\Delta^5$-pregnene-3$\beta$,20$\beta$-diol-18-oic acid 18,20-lactone 3-acetate in 200 ml. of toluene was admixed with 40 ml. of a 3 N solution of methylmagnesium chloride in tetrahydrofuran, and the resulting reaction mixture was refluxed for 48 hours. Following this reaction period the reaction mixture was cooled to room temperature, ice was added, and the mixture was then diluted with water and ethyl acetate. The organic layer was then separated and washed several times with ethyl acetate, following which it was dried over anhydrous sodium sulfate and evaporated to dryness. Crystallization of the resulting residue from acetone/hexane gave 18-methyl-$\Delta^5$-pregnene-3$\beta$,20$\beta$-diol-18-one.

This procedure was then repeated in every detail but one, namely, $\Delta^5$-pregnene-3$\beta$,20$\beta$-diol-18-oic acid 18,20-lactone 3-acetate was replaced by 19-nor-$\Delta^{5(10)}$-pregnene-3$\beta$,20$\beta$-diol-18-oic acid 18,20-lactone 3-acetate and 3-cycloethylenedioxy - 19 - nor-$\Delta^5$-pregnen-20$\beta$-ol-18-oic acid 18,20-lactone, respectively. In each case, the corresponding 18-methyl-18-one, i.e., 18-methyl-19-nor-$\Delta^{5(10)}$-pregnene-3$\beta$,20$\beta$-diol - 18 - one, and 3-cycloethylenedioxy-18-methyl - 19 - nor-$\Delta^5$-pregnen-20$\beta$-ol-18-one, respectively, was obtained.

Similarly, by replacing methylmagnesium chloride with ethylmagnesium chloride and propylmagnesium chloride, respectively, and using the three steroid starting materials mentioned hereinabove, the corresponding 18-ethyl- and 18-propyl-18-ones, i.e., 18-ethyl-$\Delta^5$-pregnene-3$\beta$,20$\beta$-diol-18-one, 18 - propyl - $\Delta^5$ - pregnene-3$\beta$,20$\beta$-diol-18-one, 18-ethyl - 19 - nor - $\Delta^{5(10)}$ - pregnene - 3$\beta$,20$\beta$ - diol - 18-one, 18 - propyl - 19 - nor-$\Delta^{5(10)}$-pregnene-3$\beta$,20$\beta$-diol-18-one, 3 - cycloethylenedioxy - 18 - ethyl-19-nor-$\Delta^5$-pregnen-20$\beta$-ol-18-one, and 3-cycloethylenedioxy-18-propyl-19-nor-$\Delta^5$-pregnen-20$\beta$-ol-18-one, respectively, were obtained.

Example II

A mixture of one gram of 18-methyl-$\Delta^5$-pregnene-3$\beta$,20$\beta$-diol-18-one, 120 cc. of diethylene glycol and 10 cc. of hydrazine hydrate (99–100%) was refluxed for 3 hours. Next, 5 grams of potassium hydroxide were added and, following a temperature rise to 230° C., the resulting reaction mixture was refluxed for an additional 4 hours. Following this reaction period the reaction mixture was extracted with methylene dichloride, then washed with an aqueous sodium hydroxide solution and diluted with an aqueous saturated sodium chloride solution. The resulting mixture was then dried over anhydrous sodium sulfate and concentrated. Recrystallization from acetone gave 18-methyl-$\Delta^5$-pregnene-3$\beta$,20$\beta$-diol.

By repeating this procedure in every detail but one, namely replacing 18-methyl-$\Delta^5$-pregnene-3$\beta$,20$\beta$-diol-18-one with the remaining 18-ones prepared as described in Example I hereinabove, 18-ethyl-$\Delta^5$-pregnene-3$\beta$,20$\beta$-diol, 18-propyl-$\Delta^5$-pregnene-3$\beta$,20$\beta$-diol, 18-methyl-19-nor-$\Delta^{5(10)}$-pregnene-3$\beta$,20$\beta$-diol, 18-ethyl-19-nor-$\Delta^{5(10)}$-pregnene-3$\beta$,20$\beta$-diol, 18-propyl-19-nor-$\Delta^{5(10)}$-pregnene-3$\beta$,20$\beta$-diol, 3-cycloethylenedioxy-18-methyl-19-nor-$\Delta^5$-pregnen-20$\beta$-ol, 3-cycloethylenedioxy-18-ethyl-19-nor-$\Delta^5$-pregnen-20$\beta$-ol, and 3-cycloethylenedioxy-18-propyl-19-nor-$\Delta^5$-pregnen-20$\beta$-ol, respectively, were obtained.

Example III

By repeating the procedure of Example I, 3-cycloethylenedioxy-$\Delta^{5,9(11)}$-pregnadien-20$\beta$-ol-18-oic acid 18,20-lactone and 3-cycloethylenedioxy-$\Delta^5$-pregnen-20$\beta$-ol-18-oic acid 18,20-lactone were converted to the corresponding 3-cycloethylenedioxy-18-methyl-$\Delta^{5,9(11)}$-pregnadien-20$\beta$-ol-18-one and 3-cycloethylenedioxy-18-methyl-$\Delta^5$-pregnen-20$\beta$-ol-18-one.

Example IV

A solution of 12.2 grams of 3-cycloethylenedioxy-18-methyl-$\Delta^{5,9(11)}$-pregnadien-20$\beta$-ol-18-one, 400 ml. of triethylene glycol, 80 ml. of 80% hydrazine hydrate and 25 grams of hydrazine dihydrochloride was heated under reflux at 145° C. for 5 hours. The mixture was allowed to cool and thereafter poured into water. The resulting mixture was extracted with ethyl acetate. The organic extract was then washed with water, dried, and evaporated under vacuum affording the corresponding 18-methyl-18-hydrazone-20$\beta$-hydroxyl steroid.

A solution of 20 ml. of 100% hydrazine hydrate and 200 ml. of diethylene glycol was distilled, under nitrogen, until the internal temperature reached 225° C. Ten grams of potassium hydroxide was then added cautiously and distillation continued, under nitrogen, until the temperature again reached 225° C. A mixture of 15 grams of the above-prepared 18-hydrazone and 150 ml. of diethylene glycol was then added slowly so that the temperature of the reaction mixture was maintained at reflux at 225° C. The resulting solution was then heated under reflux in a nitrogen atmosphere for 5 hours, cooled, diluted with water and the precipitate was collected by filtration, washed with water and dried in vacuo affording 3-cycloethylenedioxy-18-methyl-$\Delta^{5,9(11)}$-pregnadien-20$\beta$-ol which may be purified by crystallization from methanol.

Example V

By repeating the procedure of Example IV, 3-cycloethylenedioxy-18-methyl-$\Delta^5$-pregnen-20$\beta$-ol was obtained using 3-cycloethylenedioxy-18-methyl-$\Delta^5$-pregnen-20$\beta$-ol-18-one as the starting material.

Example VI

A mixture of 28 grams of 3-ethylenedioxy-11$\beta$-acetoxy-20$\beta$-hydroxy-$\Delta^5$-pregnen-18-oic acid 18,20-lactone, 700 ml. of toluene, and 400 ml. of 3 N-methyl magnesium chloride in tetrahydrofuran was heated under reflux for 4 days. The reaction mixture was cooled, poured onto ice, diluted with water and extracted by ethyl acetate. The organic layer was washed with water, dried, and evaporated affording 3-ethylenedioxy-18-methyl-$\Delta^5$-pregnen-11$\beta$,20$\beta$-diol-18-one.

Example VII

By repeating the procedure of Example VI, 3-ethylenedioxy-11$\alpha$-acetoxy-20$\beta$-hydroxy-$\Delta^5$-pregnen-18-oic acid 18,20-lactone;
3-ethylenedioxy-9,11$\beta$-oxido-20$\beta$-hydroxy-$\Delta^5$-pregnen-18-oic acid 18,20-lactone;
3$\alpha$,11$\alpha$-diacetoxy-20$\beta$-hydroxy-5$\beta$-pregnan-18-oic acid 18,20-lactone;
3$\alpha$-acetoxy-20$\beta$-hydroxy-5$\beta$-pregnan-18-oic acid 18,20-lactone;
3$\alpha$,11$\beta$-diacetoxy-20$\beta$-hydroxy-5$\beta$-pregnan-18-oic acid 18,20-lactone;
3$\beta$,11$\beta$-diacetoxy-20$\beta$-hydroxy-5$\alpha$-pregnan-18-oic acid 18,20-lactone;
3$\beta$-acetoxy-20$\beta$-hydroxy-5$\alpha$-pregnan-18-oic acid 18,20-lactone;
3-ethylenedioxy-20$\beta$-hydroxy-$\Delta^{5,9(11)}$-pregnadien-18-oic acid 18,20-lactone;
3-ethylenedioxy-11-oxo-20$\beta$-hydroxy-19-nor-$\Delta^5$-pregnen-18-oic acid 18,20-lactone;
3-ethylenedioxy-20$\beta$-hydroxy-$\Delta^{1,4}$-pregnadien-18-oic acid 18,20-lactone; and
3-ethylenedioxy-20$\beta$-hydroxy-$\Delta^{4,9(11)}$-pregnadien-18-oic acid 18,20-lactone furnished 3-ethylenedioxy-18-methyl-$\Delta^5$-pregnen-11$\alpha$,20$\beta$-dihydroxy-18-one;
3-ethylenedioxy-18-methyl-9,11$\beta$-oxido-$\Delta^5$-pregnen-20$\beta$-hydroxy-18-one;
18-methyl-5$\beta$-pregnan-3$\alpha$,11$\alpha$,20$\beta$-trihydroxy-18-one;
18-methyl-5$\beta$-pregnan-3$\alpha$,20$\beta$-dihydroxy-18-one;
18-methyl-5$\beta$-pregnan-3$\alpha$,11$\beta$,20$\beta$-trihydroxy-18-one;
18-methyl-5$\alpha$-pregnan-3$\beta$,11$\beta$,20$\beta$-trihydroxy-18-one;
18-methyl-5$\alpha$-pregnan-3$\beta$,20$\beta$-dihydroxy-18-one;
3-ethylenedioxy-18-methyl-$\Delta^{5,9(11)}$-pregnadien-20$\beta$-hydroxy-18-one;
3-ethylenedioxy-18-methyl-19-nor-$\Delta^5$-pregnen-20$\beta$-hydroxy-11,18-dione;
3-ethylenedioxy-18-methyl-$\Delta^{1,4}$-pregnadien-20$\beta$-hydroxy-18-one; and
3-ethylenedioxy-18-methyl-$\Delta^{4,9(11)}$-pregnadien-20$\beta$-hydroxy-18-one, respectively.

By substituting ethyl or n-propyl magnesium chloride, bromide or iodide for the methyl magnesium chloride employed above, the corresponding 18-ethyl-18-one and 18-propyl-18-one may be prepared.

By repeating the procedure of Example IV, the corresponding hydrazone and 18-methyl steroid of the above-prepared 18-methyl-18-one steroids were obtained.

Example VIII

By repeating the procedure of Example I, 3$\beta$-acetoxy-20$\beta$-hydroxy-5$\alpha$-pregnan-18-oic acid 18,20-lactone and 3-ethylenedioxy-11-oxo-20$\alpha$-hydroxy-$\Delta^4$-pregnen-18-oic acid 18,20-lactone furnished 18-methyl-5$\alpha$-pregnane-3$\beta$,20$\beta$-dihydroxy-18-one and 3-ethylenedioxy-18-methyl-$\Delta^4$-pregnene-20$\alpha$-hydroxy-11,18-dione, respectively.

Using the procedure of Example IV, the thus-prepared 18-one steroids were transformed into the corresponding 18-methyl steroids.

Example IX

To a cooled solution of 4 g. of 3-cycloethylenedioxy-18-methyl-$\Delta^{5,9(11)}$-pregnadien-17$\alpha$-ol-20-one in 30 ml. of tetrahydrofuran and 18 ml. of methanol is first added in small portions 6 g. of pure calcium oxide and then 6 g. of iodine. Stirring at room temperature is continued until the solution becomes a pale yellow. The mixture is then poured into ice-water containing 18 ml. of acetic acid and 2 g. of sodium thiosulfate. After stirring for 15 minutes, the solution is decanted and the solid collected by filtration to yield 3-cycloethylenedioxy-18-methyl-21-iodo-$\Delta^{5,9(11)}$-pregnadien-17$\alpha$-ol-20-one. This compound is mixed with 80 ml. of acetone and 12 g. of recently fused potassium acetate. This mixture is refluxed for 8 hours and then concentrated to a small volume, diluted with water and extracted with ethyl acetate. The ethyl acetate extracts are washed with water, dried over sodium sulfate and concentrated until crystallization occurs. The solid is collected and recrystallized from methanol:water to yield 3 - cycloethylenedioxy - 18 - methyl - 21-acetoxy-$\Delta^{5,9(11)}$-pregnadien-17$\alpha$-ol-20-one.

A mixture of 1 g. of 3-cycloethylenedioxy-18-methyl-21 - acetoxy - $\Delta^{5,9(11)}$ - pregnadien - 17$\alpha$-ol-20-one, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumina there is obtained 3-cycloethylenedioxy - 18-methyl-$\Delta^{5,9(11)}$-pregnadiene-17$\alpha$,21-diol-20-one which may be further purified by recrystallization from acetone:hexane.

A mixture of 0.5 g. of 3-cycloethylenedioxy-18-methyl-$\Delta^{5,9(11)}$ - pregnadiene - 17$\alpha$,21 - diol - 20-one in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 18-methyl-$\Delta^{4,9(11)}$-pregnadiene-17$\alpha$,21-diol-3,20-dione which is recrystallized from acetone:hexane which may be converted to the corresponding $\Delta^4$-9$\alpha$-fluoro-10$\beta$-hydroxy steroid by conventional procedures, see for example Fried et al., J.A.C.S., 79, 1130 (1957).

Example X

A solution of 6 g. of 3-cycloethylenedioxy-18-methyl-$\Delta^{5,9(11)}$-pregnadien-20$\beta$-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3 - cycloethylenedioxy - 18 - methyl-$\Delta^{5,9(11)}$-pregnadien-20-one which may be further purified by recrystallization from acetone:hexane.

What is claimed is:

1. A process for the preparation of an 18-lower alkyl-20-hydroxy-pregnane, 19-norpregnane, and derivatives thereof unsaturated in the ring nucleus which comprises reacting an 18,20-lactone steroid selected from the group consisting of the 18,20-lactones of the 20-hydroxy-pregnanes, 19-norpregnanes, and derivatives thereof unsaturated in the ring nucleus with a molar excess of the alkyl magnesium halide $R^1MgX$ wherein $R^1$ is lower alkyl containing from 1 to 3 carbon atoms and X is selected from the group consisting of bromine, chlorine and iodine, reacting the thus-obtained 18-lower alkyl-20-hydroxy-18-one steroid with a molar excess of hydrazine hydrate to obtain the corresponding 18-lower alkyl-20-hydroxy-18-hydrazone steroid, and treating said 18-hydrazone with a strong base to obtain the corresponding 18-lower alkyl-20-hydroxy steroid.

2. A process according to claim 1 wherein said 18,20-lactone steroid is reacted with said alkyl magnesium halide in an inert aromatic hydrocarbon containing organic solvent medium and said 18-one steroid is reacted with said hydrazine hydrate in the presence of a strong acid in a solvent selected from the group consisting of the lower alkylene glycols and the lower monohydric alcohols, and said 18-hydrazone is treated with an organic solution of a strong base to obtain said 18-lower alkyl-20-hydroxy steroid.

3. A process according to claim 1 which comprises reacting an 18,20-lactone selected from the group consisting of the 18,20-lactones of the 20$\beta$-hydroxy-pregnanes, 19-norpregnanes, and derivatives thereof unsaturated in the ring nucleus with said alkyl magnesium halide in an inert aromatic hydrocarbon containing organic solvent medium to obtain the corresponding 18-lower alkyl-20$\beta$-hydroxy-18-one steroid, reacting and 18-one steroid with said hydrazine hydrate in the presence of a strong acid in a solvent selected from the group consisting of the lower alkylene glycols and the lower monohydric alcohols, and treating said 18-hydrazone with an organic solution of a strong base to obtain the corresponding 18-lower alkyl-20$\beta$-hydroxy steroid.

4. A process according to claim 1 which comprises reacting an 18,20-lactone selected from the group consisting of the 18,20-lactones of the 20$\beta$-hydroxy-pregnanes, 19-norpregnanes, and derivatives thereof unsaturated in the ring nucleus with from about 10 to 60 mols of said alkyl magnesium halide per mol of said 18,20-lactone at a temperature of from 60° to 150° C. in an aromatic hydrocarbon solvent selected from the group consisting of toluene, benzene, and xylene to obtain the corresponding 18-lower alkyl-20$\beta$-hydroxy-18-one steroid, refluxing said 18-one steroid with about 20 to 40 molar equivalents of said hydrazine hydrate and about 5 to 10 molar equivalents of a strong acid in a lower alkylene glycol solvent to obtain the corresponding 18-hydrazone steroid, dissolving said 18-hydrazone in a lower alkylene glycol solvent to obtain a solution thereof, and adding said solution to an organic solution of a strong base selected from the group consisting of potassium hydroxide and sodium hydroxide dissolved in a lower alkylene glycol, said base being present in the amount of about 1 to 10% by weight of said organic solution, while maintaining the temperature of said organic solution at from about 215° to 240° C.

5. A process according to claim 4 wherein said alkyl magnesium halide is an alkyl magnesium chloride.

6. A process according to claim 4 wherein said 18,20-lactone is refluxed with from about 10 to 40 mols of said alkyl magnesium halide and said 18-one steroid is refluxed with from about 25 to 35 molar equivalents of said hydrazine and about 6 to 8 molar equivalents of a strong acid in a lower alkylene glycol, and said base is present in the amount of about 3 to 5% by weight.

7. A process according to claim 1 which comprises refluxing an 18,20-lactone selected from the group consisting of the 18,20-lactones of the 20$\beta$-hydroxy-pregnanes, 19-norpregnanes, and derivatives thereof unsaturated in the ring nucleus with from about 10 to 40 mols of said alkyl magnesium halide per mol of said 18,20-lactone in toluene to obtain the corresponding 18-lower alkyl-20$\beta$-hydroxy-18-one steroid, refluxing said 18-one steroid with about 30 molar equivalents of said hydrazine hydrate and about 7 molar equivalents of a strong acid selected from the group consisting of hydrochloric acid, para-toluenesulfonic acid and hydrazine dihydrochloride in triethylene glycol to obtain the corresponding 18-hydrazone steroid, dissolving said 18-hydrazone in diethylene glycol to obtain a solution thereof, and adding said solution to an organic solution of a strong base selected from the group consisting of potassium hydroxide and sodium hydroxide dissolved in diethylene glycol, said base being present in the amount of about 3 to 5% by weight while maintaining said organic solution at a temperature of about 225° C.

8. A process according to claim 7 wherein said organic solution is under an inert atmosphere.

9. A process according to claim 8 wherein said alkyl magnesium halide is an alkyl magnesium chloride, said strong acid is hydrazine dihydrochloride, said base is potassium hydroxide and said inert atmosphere is nitrogen.

10. A process according to claim 9 wherein said alkyl is methyl.

11. A compound of the formula:

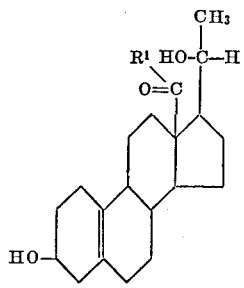

wherein $R^1$ is a lower alkyl containing from 1 to 3 carbon atoms.

12. A compound of the formula:

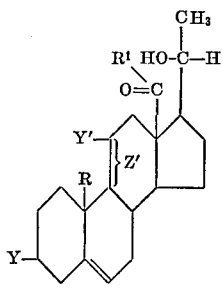

wherein R is selected from the group consisting of hydrogen and methyl, $R^1$ is a lower alkyl containing from 1 to 3 carbon atoms, Y is selected from the group consisting of beta hydroxyl and cycloethylenedioxy, Y' is selected from the group consisting of hydrogen, alpha hydroxyl, and beta hydroxyl, and Z' is selected from the group consisting of a single bond and a double bond between carbon-9 and carbon-11, provided that Z' is a single bond when Y' is hydroxyl.

13. A compound according to claim 12 wherein Z' is a single bond.

14. A compound according to claim 12 wherein Z' is a single bond, Y is beta hydroxyl, R is methyl and Y' is hydrogen.

15. A compound according to claim 12 wherein Z' is a single bond, Y is beta hydroxyl, Y' is hydrogen, R is methyl and $R^1$ is methyl.

16. A compound according to claim 12 wherein Z' is a single bond and Y is cycloethylenedioxy.

17. A compound according to claim 12 wherein Z' is a single bond, Y is cycloethylenedioxy and R is methyl.

18. A compound according to claim 12 wherein Z' is a single bond, Y is cycloethylenedioxy, R is methyl and $R^1$ is methyl.

19. A compound according to claim 12 wherein Z' is a double bond, Y' is hydrogen, Y is cycloethylenedioxy, and R is methyl.

20. A compound according to claim 19 wherein $R^1$ is methyl.

21. A compound of the formula:

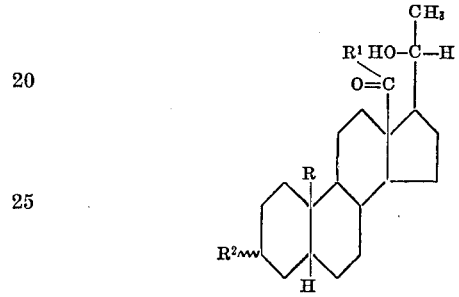

wherein, R is selected from the group consisting of hydrogen and methyl, $R^1$ is a lower alkyl containing from 1 to 3 carbon atoms, and $R^2$ is selected from the group consisting of alpha and beta hydroxy.

22. A compound according to claim 21 wherein R is methyl.

23. A compound according to claim 21 wherein R and $R^1$ are each methyl and $R^2$ is beta hydroxy.

24. A compound according to claim 21 wherein R and $R^1$ are each methyl and $R^2$ is alpha hydroxy.

References Cited

UNITED STATES PATENTS 3,287,378   11/1966   Jeger et al. _____ 260—397.3

H. FRENCH, *Primary Examiner.*